No. 773,219. PATENTED OCT. 25, 1904.
A. E. NORRIS.
HOISTING APPARATUS.
APPLICATION FILED MAY 20, 1901.
NO MODEL.
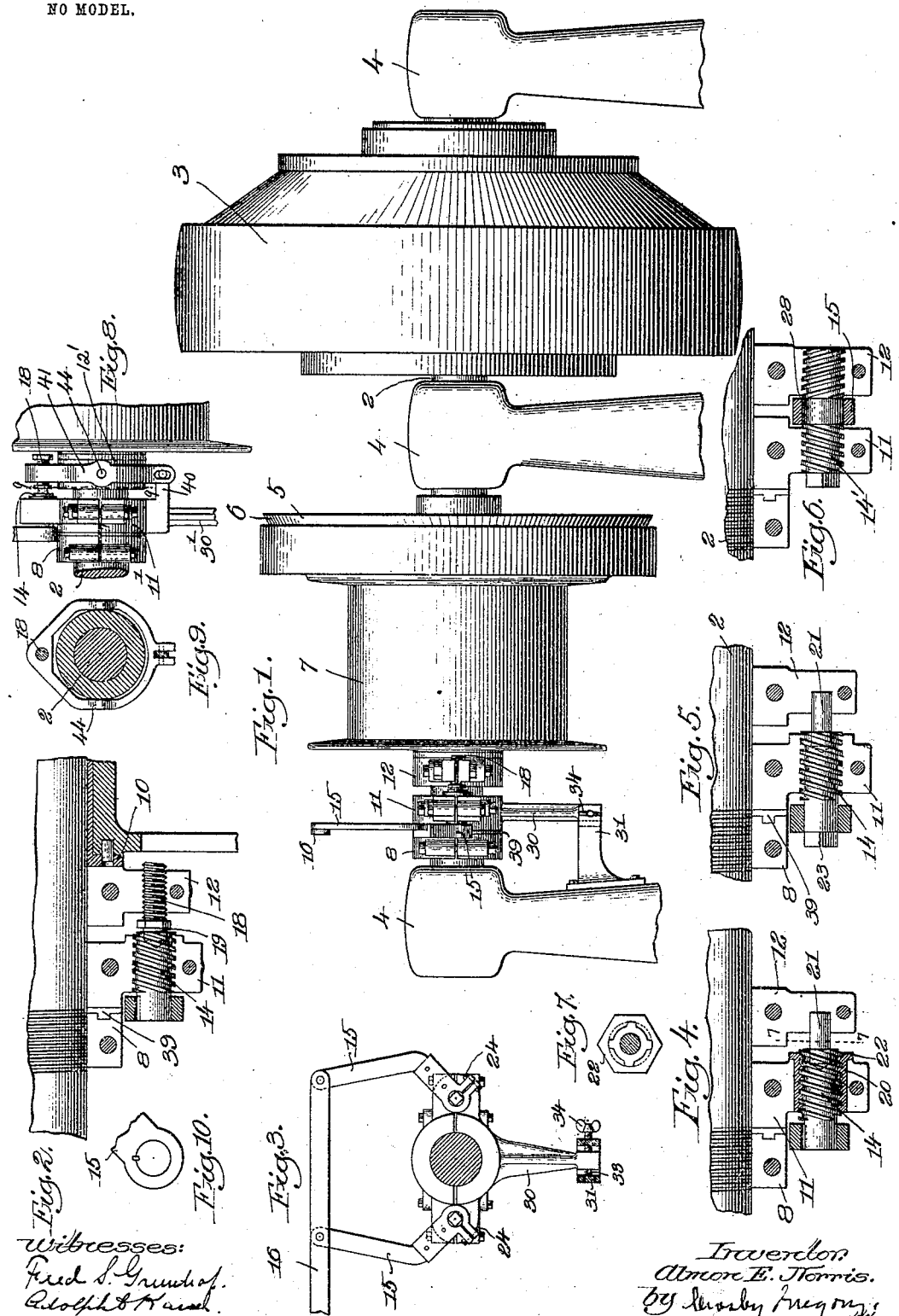

No. 773,219. Patented October 25, 1904.

UNITED STATES PATENT OFFICE.

ALMON E. NORRIS, OF CAMBRIDGE, MASSACHUSETTS.

HOISTING APPARATUS.

SPECIFICATION forming part of Letters Patent No. 773,219, dated October 25, 1904.

Application filed May 20, 1901. Serial No. 61,014. (No model.)

*To all whom it may concern:*

Be it known that I, ALMON E. NORRIS, a citizen of the United States, residing at Cambridge, in the county of Middlesex and State of Massachusetts, have invented an Improvement in Hoisting Apparatus, of which the following description, in connection with the accompanying drawings, is a specification, like numerals on the drawings representing like parts.

This invention relates to hoisting apparatus which include a shaft mounted in suitable bearings and having a fixed friction member thereon which is adapted to be engaged by a friction-drum loose on the shaft, suitable mechanism being employed to cause the engagement of the friction-drum with the friction member.

The object of the invention is to provide a simple and effective mechanism for moving the drum longitudinally on the shaft to cause it to engage the friction member when it is desired to rotate the drum.

The invention comprises a shaft having a shoulder thereon between which and the friction-drum are a plurality of non-rotating collars loose upon the shaft, one of said collars abutting against the shoulder on the shaft and the other of said collars engaging the friction-drum. One of the collars has mounted therein a screw which operates against the other of said collars, and suitable mechanism is employed to turn the screw in the collar, thus causing the collars to separate. Since one of the collars abuts against the shoulder on the shaft, the separation of the collars causes the drum to move longitudinally of the shaft, and thus engage the fixed friction member. The mechanism employed to turn the screws operates to give the screws a limited turning movement and to compensate for wear between the parts. I have provided some suitable adjusting device which coöperates with the screw, whereby the limited turning movement of the screw may cause the friction-drum to engage the friction member even after wear has occurred. Preferably the collars will be split, so that they may be removed from the shaft to allow the drum to be moved longitudinally of the shaft sufficiently to expose the friction-surfaces on the friction member.

In the drawings, Figure 1 is an elevation of one form of hoisting apparatus with my improvement thereon. Fig. 2 is a part-sectional view showing the mechanism for giving the drum its longitudinal movement. Fig. 3 is an elevation of the operating-levers, showing the form of lever used in connection with the modification illustrated in Fig. 5. Figs. 4, 5, and 6 show different ways in which the adjustment to compensate for wear may be effected. Fig. 7 is a section on the line 7 7, Fig. 4. Fig. 8 is a modification hereinafter referred to. Fig. 9 is a section on line 9, Fig. 8; and Fig. 10 shows one way of attaching the operating-levers to the screws.

The shaft 2, which may be driven in any suitable way—as, for instance, by the motor 3—is mounted in suitable bearings 4 and has fast thereon the friction member 5, said friction member having the usual conical friction-surface 6, which is adapted to engage a coöperating friction-surface upon the drum 7, loose upon the shaft. When it is desired to rotate the drum to wind the hoisting-rope thereon, it is necessary to move the drum 7 longitudinally of the shaft to cause the friction-surface of the drum and friction member, respectively, to engage. The mechanism to accomplish this and which forms the basis of this application comprises a suitable shoulder fast on the shaft between which and the drum are a plurality of non-rotating collars which are loose upon the shaft, and one of said collars has therein a screw operating against the other collar. The shoulder may be made in any suitable way, either integral with the shaft or may be in the form of a collar 8, which is fast to the shaft and rotates therewith, the said collar in this embodiment of my invention being shown as a split collar which is screwed to the shaft. (See Fig. 2.) It will be obvious, however, that the collar may be secured to the shaft in any suitable way and may be an integral collar, if desired.

Between the collar 8 and the hub 10 of the friction-drum are two non-rotating collars 11 and 12, respectively, which are loose upon the shaft, the collar 11 abutting the fast collar 8 and the collar 12 engaging the hub 10 of the drum 7. One of these collars, preferably the collar 11, has therein the screw 14, which operates against the collar 12, the head of said screw having secured thereto the operating-lever 15, by means of which the screw is turned. Preferably I will employ two such screws 14 on opposite sides of the collar, as seen in Fig. 3, the levers 15, connected to said screws, being united by the link 16, which in turn is connected to a hand-lever. (Not shown.) By turning the levers 15 the screws 14 are advanced through the collar 11, and since they operate against the collar 12 it will be obvious that the drum 7 will be moved into position to be clutched to the fixed friction member 5. With this form of operating mechanism the screws 14 have a definite limited turning movement, and it will be obvious that when wear occurs between the engaging parts the limited turning movement of the levers 13 will not advance the drum sufficiently to cause it to engage the fixed friction member. To obviate this difficulty, I have provided a suitable adjusting device coöperating with the screws 14, which compensates for this wear.

In Fig. 2 the form of adjusting device comprises an adjusting-screw 18, carried by the collar 12, the end of said adjusting-screw being received in a suitable recess in the ends of the screw 14. It will be obvious that by turning the adjusting-screw 18 any slack due to wear may be compensated for.

In Fig. 4 I have illustrated another form of adjusting device, and in this embodiment of my invention the screws 14 are mounted in suitable bushings 20 in the collar 11, and said screws bear against fixed thrust-pins 21, carried by the collar 12.

Referring to Fig. 7, it will be seen that the bushings 20 are provided with the polygonal flanges 22, by means of which the said bushings may be turned in the collar 11 relative to the screws 14, such turning movement operating to advance the screws sufficiently to compensate for wear.

In Fig. 5 a still different modification is illustrated, the adjustment in this case being effected by turning the screws 14 relative to the operating-lever 15. The screws 14 in this instance bear against pins 21, fixed in the collar 12, as in the modification shown in Fig. 4, said pins being received in suitable recesses in the ends of the screws 14. In this form of my invention the operating-levers 15 will have the head portions thereof, which embrace the head end of the screws 14, split, as shown in Fig. 3, and the projecting end 23 of said screw will be square, so that a wrench may be applied. By loosening the clamping-bolts 24 in the split ends of the levers 15 it will be obvious that the screws may be turned relative to the levers sufficiently to compensate for wear.

In Fig. 6 another modification is illustrated, wherein the screw 14' has right and left hand screw-threads, respectively, the said screw-threads engaging screw-threaded recesses in the collars 11 and 12, respectively. The center portion 28 of the screw 14' has clamped thereabout the end of the operating-lever 15. By turning the lever 15 the collars 11 and 12 will be separated sufficiently to cause the drum to engage the friction member. This modification is different from those above described in that the screw operates to give the collar 12 a positive movement in both directions. The adjustment of the screw to compensate for wear in this modification is accomplished in the same manner as in the modification shown in Fig. 5—that is, the head of the levers 15 may be split and clamped about the central portion of the screw 14', and said screw may be provided with a square end to which a wrench may be applied. By adjusting the screws relative to the levers 15 any slackness due to wear may be compensated for.

In the modification shown in Figs. 2, 4, and 8 the head of the lever 15 may be keyed to the screw, as seen in Fig. 10, since it is not necessary to adjust the screw relative to the lever.

In all of the above modifications I prefer to use a suitable wearing-washer 39 between the fast collar 8 and the non-rotary collar 11, said washer preferably being split and having an annular projection on one face which engages a corresponding groove in one of the collars.

As stated above, the collars 11 and 12 are non-rotating collars, and to hold said collars from rotating I have shown the collar 11 as provided with the stem 30, the end of which engages a fixed stop 31, supported upon any suitable fixed support, such as the bearing 4. Preferably the end of the stop 31 will be forked, as shown in Fig. 3, and the end of the stem 30 will be received between the branches of the fork. Preferably a suitable spring 33 will be confined between one of the branches of the fork of the support and the end of the stem 30, such spring operating to cushion the stem 30 and prevent any jar or vibration caused by the shifting of the clutch mechanism.

I may, if desired, provide the adjusting-screw 34, which passes through one branch of the fork-support 31 and engages the stem 30, said adjusting-screw operating to hold the stem against the compressed spring 33.

Figs. 8 and 9 show a form of my invention wherein only a single screw 14 is used instead of a pair of such screws, as in the other figures of the drawings. In this embodiment of the invention the non-rotating loose collar 11', which corresponds to collar 11 in the other modifications, has the lug 40 projecting therefrom, preferably from the stem 30', and a yoke 41 is pivoted to such lug, the said yoke embracing the collar 12', which is loose on the shaft 2 and engages the hub of the drum.

The arms of the yoke are connected to opposite sides of the collar by pins 44, and the upper end of the yoke has therein the adjusting-screw 18, against which the screw 14 in the collar 11' operates. By turning the screw 14 the yoke is swung about its pivotal point with the lug 40, and the collar 12' will force the drum longitudinally of the shaft.

In all of the above-described modifications I prefer to make both of the loose collars and also the fast collar split and separable, for then they may be readily removed from the shaft to allow of separating the drum from the friction member when it is desired to renew the friction-surface.

One advantage derived from my invention is that the thrust occasioned by the shifting of the drum longitudinally of the shaft is all taken by the collar 8 on the shaft and is not transmitted to the bearings. The operation of causing the drum 7 to engage the fixed friction member does not tend to force the shaft longitudinally of the bearings, as it would be if the collar 12 bore against the bearing or some fixed abutment other than the collar 8.

This device is especially useful also in hoisting apparatus wherein an electric motor is coupled direct to the shaft to drive the same, for the shaft may have a slight longitudinal movement in the bearings, such as is necessary for the perfect action of the armature, without in any way effecting or being effected by the operation of clutching the drum to the fixed friction member.

Various changes may be made in the structure of the device without departing from the spirit of the invention as expressed in the appended claims.

Having thus fully described my invention, what I claim as new, and desire to secure by Letters Patent, is—

1. In a hoisting mechanism, a shaft having a friction member fixed thereto and a friction-drum loose thereon, a collar fast to the shaft, a non-rotating collar loose on said shaft and engaging said fast collar, a thrust-collar between said non-rotating collar and drum, a screw in one of said last-named collars and operating against the other, and means to turn said screw.

2. In a hoisting mechanism, a shaft having a shoulder thereon, a friction member fixed to said shaft and a friction-drum loose thereon, means to cause said drum to engage said friction member, said means including a plurality of collars loose on said shaft, and between the shoulder and friction-drum, a thrust-screw in one of said collars and operating against the other, and means to prevent said collars from rotating.

3. In a hoisting mechanism, a shaft, a friction member fixed thereto, a friction-drum loose thereon, and means to cause said drum to engage the friction member, said means comprising a collar fast to the shaft, two non-rotary collars loose on the shaft between said fast collar and friction-drum, a screw in one of said loose collars and operating against the other, means to give said screw a limited turning movement, and adjusting devices to compensate for wear.

4. In a hoisting-engine, a shaft having a friction member fixed thereto and a friction-drum loose thereon, and means to bring said friction-drum into engagement with the friction member, said means including a collar fast to the shaft, two loose collars on said shaft between the fast collar and the drum, a pair of screws mounted in one of said loose collars and operating against the other, and operating-levers adapted to give the screws a limited turning movement.

5. In a hoisting-engine, a shaft having a friction member fixed thereto and a friction-drum loose thereon, and means to bring said friction-drum into engagement with the friction member, said means including a collar fast to the shaft, two loose collars on said shaft between the fast collar and the drum, a pair of screws mounted in one of said loose collars and operating against the other, operating-levers adapted to give the screws a limited turning movement, and adjusting devices coöperating with the screws to compensate for wear.

6. In a hoisting mechanism, a shaft having a friction member fixed thereto and a friction-drum loose thereon, a collar fast on said shaft, and two collars loose thereon, one of said loose collars having a stem projecting therefrom, means to engage said stem and hold said collar from turning, a screw mounted in one of said loose collars and operating against the other, and means to give said screw a limited turning movement.

7. In a hoisting mechanism, a shaft having a friction member fixed thereto and a friction-drum loose thereon, a collar fast on said shaft, and two collars loose thereon, one of said loose collars having a stem projecting therefrom, means to engage said stem and hold said collar from turning, a screw mounted in one of said loose collars and operating against the other, means to give said screw a limited turning movement, and adjusting devices coöperating with the screw to compensate for wear.

8. In a hoisting mechanism, a shaft having a friction member fixed thereto and a friction-drum loose thereon, and means to bring said drum and friction member into engagement, said means including a collar fast on the shaft, two collars loose on the shaft between the fast collar and friction-drum, a stem projecting from one of said collars, a fixed support to engage said stem and hold said collar from turning, a pair of screws in one of said loose collars, and operating against the other, means to give said screws a limited turning movement, and adjusting devices to compensate for wear.

9. In a hoisting mechanism, a shaft having a friction member fixed thereto and a friction-drum loose thereon, a collar fast to the shaft, a split non-rotating collar loose on said shaft and engaging said fast collar, a thrust-collar between said non-rotating collar and drum, a screw in one of said last-named collars and operating against the other, and means to turn said screw.

10. In a hoisting mechanism, a shaft, a friction member fixed thereto, a friction-drum loose thereon, and means to cause said drum to engage the friction member, said means comprising a collar fast to the shaft, two non-rotating split collars loose on the shaft between said fast collar and friction-drum, a screw in one of said loose collars and operating against the other, means to give said screw a limited turning movement, and adjusting devices to compensate for wear.

11. In a hoisting-engine, a shaft having a friction member fixed thereto and a friction-drum loose thereon, and means to bring said friction-drum into engagement with the friction member, said means including a split collar fast to the shaft, two split and separable collars loose on said shaft between the fast collar and the drum, a pair of screws mounted in one of said loose collars and operating against the other, operating-levers adapted to give the screws a limited turning movement, and adjusting devices coöperating with the screws to compensate for wear.

12. In a hoisting mechanism, a shaft having a friction member fixed thereto and a friction-drum loose thereon, and means to bring said drum and friction member into engagement, said means including a split collar fast on the shaft, two split and separable collars loose on the shaft between the fast collar and friction-drum, a stem projecting from one of said collars, a fixed support to engage said stem and hold said collar from turning, a pair of screws in one of said loose collars and operating against the other, means to give said screws a limited turning movement, and adjusting devices to compensate for wear.

13. In a hoisting mechanism, a shaft having a friction member fixed thereto, and a friction-drum loose thereon, a collar fast to the shaft, a non-rotating collar loose on said shaft and engaging said fast collar, a thrust-collar between the said non-rotating collar and the drum, and means for causing the separation of the non-rotating and thrust-collars when it is desired to throw the clutch into operation.

14. In a hoisting mechanism, a shaft having a friction member fixed thereto and a friction-drum loose thereon, an abutment-collar fixed to the shaft, a loose collar between the abutment-collar and the friction-drum, a screw supported by the loose collar, a thrust-bearing engaging the friction-drum, and against which a set-screw operates, and means to rotate the screw.

15. In mechanism of the class described, the combination with driving and driven members relatively movable toward and from each other, of means for moving one of the members toward the other, said means comprising coacting elements, one of which has a spiral movement with respect to the other, said other element being rotatable, and means for holding the rotatable element against movement and in different positions.

In testimony whereof I have signed my name to this specification in the presence of two subscribing witnesses.

ALMON E. NORRIS.

Witnesses:
LOUIS C. SMITH,
GEO. W. GREGORY.